United States Patent
Brockley

(10) Patent No.: US 10,711,709 B2
(45) Date of Patent: Jul. 14, 2020

(54) CONTROLLING AN AIR CHARGE PROVIDED TO AN ENGINE

(71) Applicant: JAGUAR LAND ROVER LIMITED, Warwickshire (GB)

(72) Inventor: Nick Brockley, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 61 days.

(21) Appl. No.: 16/033,462

(22) Filed: Jul. 12, 2018

(65) Prior Publication Data

US 2018/0363573 A1 Dec. 20, 2018

(30) Foreign Application Priority Data

Jun. 12, 2017 (GB) .................................. 1709302.2

(51) Int. Cl.
 *F02D 13/00* (2006.01)
 *F02D 41/00* (2006.01)
 (Continued)

(52) U.S. Cl.
 CPC ..... *F02D 41/0002* (2013.01); *F02D 13/0226* (2013.01); *F02D 2013/0296* (2013.01); *F02D 2041/001* (2013.01); *F02D 2041/1433* (2013.01); *F02D 2200/0402* (2013.01); *F02D 2200/0408* (2013.01)

(58) Field of Classification Search
 CPC ................. F02D 13/00; F02D 13/0226; F02D 2013/0296; F02D 41/0002; F02D 2041/001; F02D 2041/1433; F02D 2200/0402; F02D 2200/0408
 See application file for complete search history.

(56) References Cited

U.S. PATENT DOCUMENTS 7,292,931 B2 * 11/2007 Davis ...................... F02D 41/18
 701/102
8,271,180 B2 * 9/2012 Takamiya ............... F02D 13/02
 123/345

(Continued)

FOREIGN PATENT DOCUMENTS

JP 2004183535 A 7/2004
JP 2009062838 A 3/2009

(Continued)

OTHER PUBLICATIONS

Combined Search and Examination Report under Sections 17 and 18(3) for Application No. GB1709302.2 dated Nov. 30, 2017.

*Primary Examiner* — Thomas N Moulis

(74) *Attorney, Agent, or Firm* — Carlson, Gaskey & Olds

(57) ABSTRACT

A method, an apparatus, a computer program, an engine intake system, and a vehicle are provided. The method is for controlling an air charge provided to a vehicular engine. The method comprises determining a target valve lift of an inlet valve in a continuously variable valve lift system based, at least in part, on: a required air charge for a given torque request; and an estimate of a variable pressure of an engine intake manifold for a time when the inlet valve is to be actuated in accordance with the target valve lift. The method also comprises controlling actuation of the inlet valve in the continuously variable valve lift system in accordance with the determined target valve lift.

13 Claims, 5 Drawing Sheets

(51) Int. Cl.
*F02D 13/02* (2006.01)
*F02D 41/14* (2006.01)

(56) References Cited

U.S. PATENT DOCUMENTS

| | | | |
|---|---|---|---|
| 9,617,930 B2* | 4/2017 | Kang | F02D 41/0002 |
| 9,664,124 B2* | 5/2017 | Yu | F02D 41/0002 |
| 2002/0133286 A1* | 9/2002 | Kolmanovsky | F02D 41/1401 |
| | | | 701/104 |
| 2004/0007194 A1* | 1/2004 | Iizuka | F01L 1/34 |
| | | | 123/90.15 |
| 2004/0015287 A1 | 1/2004 | Hzuka et al. | |
| 2004/0083047 A1* | 4/2004 | Li | F02D 41/18 |
| | | | 701/102 |
| 2005/0060084 A1* | 3/2005 | Dudek | F02D 41/18 |
| | | | 701/102 |
| 2005/0205055 A1* | 9/2005 | Shimizu | F02D 9/02 |
| | | | 123/346 |
| 2006/0293827 A1* | 12/2006 | Frauenkron | F02D 41/2451 |
| | | | 701/103 |
| 2007/0088486 A1* | 4/2007 | Bauer | F02D 41/0002 |
| | | | 701/103 |
| 2007/0240679 A1* | 10/2007 | Tabata | F02B 29/083 |
| | | | 123/348 |
| 2009/0013945 A1* | 1/2009 | Buckland | F02B 37/007 |
| | | | 123/90.15 |
| 2009/0018754 A1* | 1/2009 | Hano | F01L 1/3442 |
| | | | 701/103 |
| 2009/0178644 A1* | 7/2009 | Delp | F02D 13/0226 |
| | | | 123/321 |
| 2010/0299050 A1* | 11/2010 | Delp | F02D 13/0226 |
| | | | 701/103 |
| 2010/0305832 A1* | 12/2010 | Asano | F02D 13/0219 |
| | | | 701/103 |
| 2012/0117011 A1* | 5/2012 | Hashimoto | F02D 13/0226 |
| | | | 706/23 |
| 2012/0158374 A1* | 6/2012 | Muller | F02D 41/2432 |
| | | | 703/2 |
| 2014/0034026 A1* | 2/2014 | Katsumata | F02D 41/0007 |
| | | | 123/559.1 |
| 2017/0009710 A1* | 1/2017 | Lee | F02D 41/0062 |
| 2017/0145927 A1* | 5/2017 | Bucknell | F01L 1/22 |
| 2017/0306859 A1* | 10/2017 | Tatavarthi | F01L 13/00 |

FOREIGN PATENT DOCUMENTS

| | | |
|---|---|---|
| JP | 2010196588 A | 9/2010 |
| JP | 2012188956 A | 10/2012 |
| JP | 2013245624 A | 12/2013 |

* cited by examiner

CONTROLLING AN AIR CHARGE PROVIDED TO AN ENGINE

CROSS REFERENCE TO RELATED APPLICATION

This application claims priority to United Kingdom Patent Application No. GB 1709302.2, filed on 12 Jun. 2017.

TECHNICAL FIELD

The present disclosure relates to controlling an air charge provided to an engine. In particular, but not exclusively it relates to controlling an air charge provided to a vehicular engine.

Aspects of the invention relate to a method, an apparatus, a computer program, an engine intake system, and a vehicle.

BACKGROUND

It is known to control the air charge provided to a vehicular engine in order to achieve a torque response in line with a torque request provided to the vehicle by, for example, a driver. The fresh air charge provided to an engine is largely a function of the valve lift of the inlet valves and the pressure of the engine intake manifold, together with partial pressure from the exhaust gas residual fraction which can be altered by the both the inlet and exhaust valve timing.

In some engine systems the required air charge is achieved through variation of the pressure in the engine intake manifold whilst the valve lift of the inlet valves is fixed and predetermined. Specifically, the valve lift is dictated solely by the cam profile and thus is not varied cycle-on-cycle. The pressure of the engine intake manifold is varied by controlling the throttle valve, which controls the flow of air into the engine intake manifold.

These engine systems have high pumping losses, particularly at idle or at small throttle valve openings, due to a high pressure differential across the inlet valve which in turn requires the piston to do more work to draw the air from the engine intake manifold into the engine's cylinders.

In other engine systems the throttle valve is controlled to maintain a fixed pressure within the engine intake manifold or else these engine systems do not comprise a throttle valve at all. Variation in the air charge provided to the engine is achieved by controlling the valve lift of the inlet valves. The valve lift of the inlet valves is not fixed. The valve lift is varied to achieve the required engine charge and the control of this variation assumes a fixed engine intake manifold pressure.

In order to achieve the required air charge using these engine systems the inlet valves may remain open for a longer or shorter period of the combustion cycle than is optimal. As a result, the air charge motion within the engine's cylinders is sub-optimal and this in turn decreases the combustion efficiency, resulting in a decrease in the fuel economy.

It is an aim of the present invention to address disadvantages of the known engine systems and provide a more efficient engine without compromising the responsivity to a torque request.

SUMMARY OF THE INVENTION

Aspects and embodiments of the invention provide a method, an apparatus, a computer program, an engine intake system, and a vehicle as claimed in the appended claims.

According to an aspect of the invention there is provided a method of controlling an air charge provided to a vehicular engine. The method comprises determining a target valve lift of an inlet valve in a continuously variable valve lift system based, at least in part, on: a required air charge for a given torque request; and an estimate of a variable pressure of an engine intake manifold for a time when the inlet valve is to be actuated in accordance with the target valve lift. The method also comprises controlling actuation of the inlet valve in the continuously variable valve lift system in accordance with the determined target valve lift.

This provides the advantage of, as a result of estimating the engine manifold pressure forwards in time, reducing the amount by which the air charge provided to the engine exceeds or falls below the amount required to achieve a torque response matching the torque request. This results in improved matching of the torque response to the torque request which has benefits in terms of the fuel economy and the response of the vehicle.

In some examples the estimate of a variable pressure of an engine intake manifold for a time when the inlet valve is to be actuated in accordance with the target valve lift is determined at least a first time period before a time when the inlet valve is to be actuated in accordance with the target valve lift.

In some examples a duration of the first time period is equal to a delay between output of a control signal to command actuation of the inlet valve in accordance with the target valve lift and the actuation of the inlet valve in accordance with the target valve lift.

This provides the advantage that the valve lift is actuated in accordance with a target valve lift which is appropriate for the pressure of the engine intake manifold at the time that the actuation is effected. Therefore during transient conditions, which occur when a torque request changes, the air charge provided to the engine does not over shoot or undershoot the required air charge to meet the changed torque request.

In some examples the estimate of a variable pressure of an engine intake manifold for a time when the inlet valve is to be actuated in accordance with the target valve lift is based, at least in part, on an output of a model of a predicted change in a pressure of an engine intake manifold as a function of time.

In some examples the model of the predicted change in the pressure of an engine manifold as a function of time is based, at least in part, on the required air charge.

In some examples a correction is applied to the output of the model of the predicted change in the pressure of an engine intake manifold as a function of time.

In some examples the correction is based, at least in part, on a difference between the output of the model for a given time and a measurement of the pressure of the engine intake manifold at the given time.

Because valve lift control depends on pressure in the engine intake manifold and the pressure depends on the valve lift, step changes in the control of the valve lift can destabilize the engine air intake system. Therefore applying a correction to the output of the model provides the advantage that any discrepancies between the predicted change in the pressure of an engine intake manifold as a function of time and the actual pressure of the engine intake manifold can be mitigated during transient conditions thus avoiding a significant step change in the control of the valve lift following the transient conditions.

In some examples a value of the correction is determined intermittently and changes in the values of the correction over time are smoothed.

By smoothing changes in the values of the correction over time, step changes in the response are advantageously avoided.

In some examples smoothing changes in the values of the correction over time comprises summing: a product of a first factor and the difference between the output of the model for a given time and a measurement of the pressure of the engine intake manifold at the given time; and a product of a second factor and an immediately preceding value of the correction. The first factor and the second factor sum to unity.

In some examples a change in the required air charge is detected and a decay factor is applied to an immediately preceding value of the correction in addition to the second factor applied thereto. The decay factor is based, at least in part, on the change in the required air charge.

Because the value of the correction determined in relation to one torque request may not be suitable for other torque request, applying the decay factor provides the advantage that the correction can be smoothly reset for each change in torque request. This also advantageously avoids resetting the correction with a step change.

In some examples an input valve of an engine intake manifold is controlled based, at least in part, on the required air charge.

This provides the advantage that the required air charge is not achieve only by means of varying the valve lift. Therefore the air charge motion within the engine cylinders is less compromised resulting in an increase in the combustion efficiency and thus in the fuel economy.

In some examples determining a target valve lift comprises determining a target closing angle of the inlet valve.

In some examples the opening angle of the inlet valve is one of predetermined or controlled independently of the required air charge.

According to another aspect of the invention there is provided a computer program that, when run on a computer, performs the method of controlling an air charge provided to a vehicular engine as hereinbefore described.

According to another aspect of the invention there is provided an apparatus comprising: at least one processor; and at least one memory including computer program code. The at least one memory and the computer program code are adapted to, with the at least one processor, cause the apparatus at least to perform the method of controlling an air charge provided to a vehicular engine as hereinbefore described.

According to a further aspect of the invention there is provided an engine air intake system comprising: an engine intake manifold; an input valve of the engine intake manifold; a continuously variable valve lift system; and the apparatus caused to at least perform the method of controlling an air charge provided to a vehicular engine as hereinbefore described.

According to a further aspect of the invention there is provided a vehicle comprising: an internal combustion engine; and the engine air intake system as hereinbefore described.

In some, but not necessarily all, examples of the invention there is provided a method comprising: determining a target valve lift of an inlet valve in a continuously variable valve lift system based, at least in part, on: a required air charge for a given torque request; and an estimate of a variable pressure of an engine intake manifold for a time when the inlet valve is to be actuated in accordance with the target valve lift.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The Figures illustrate a method of providing a torque response from an engine which matches the torque request provided to the vehicle, for example by the operation of an accelerator pedal by a driver of the vehicle.

Figure 1:
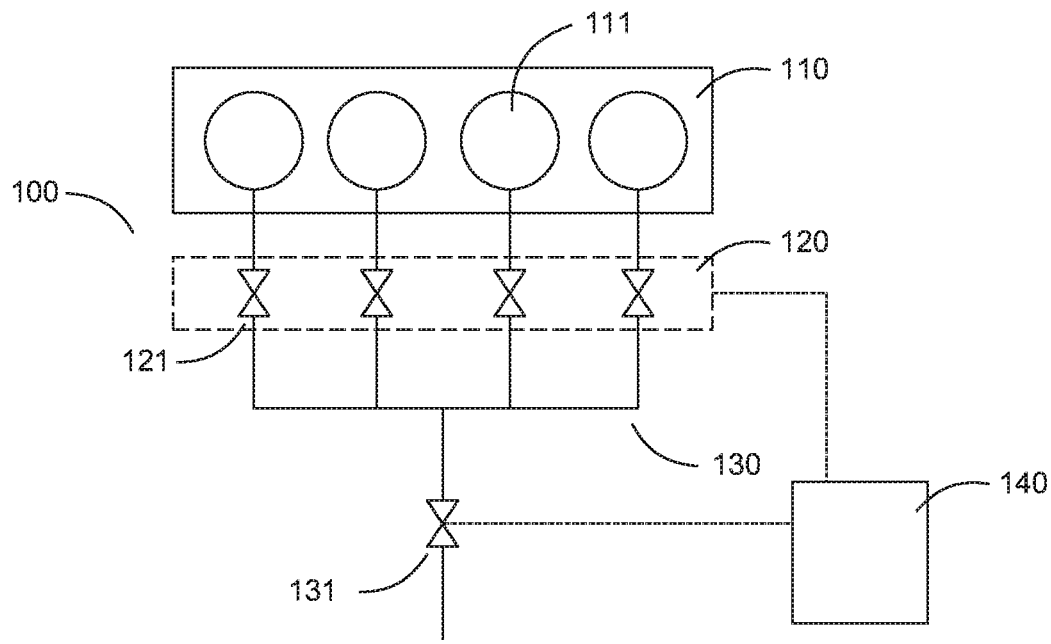
FIG. 1 schematically illustrates an example of an engine air intake system.

FIG. 1 schematically illustrates an example of an engine air intake system 100. The engine air intake system 100 is for use with an engine 110, for example a vehicular engine and in some examples an internal combustion engine comprising a plurality of cylinders 111. The engine air intake system 100 comprises a continuously variable valve lift system 120 comprising a plurality of inlet valves 121 which are operable to permit or prevent the flow of air into the engine's cylinders 111. The engine air intake system 100 also comprises an engine intake manifold 130 and an input valve 131 of the engine intake manifold 130 which is adapted to control the flow of air into the engine intake manifold 130. In some examples the input valve 131 is a butterfly valve. The engine air intake system 100 further comprises an apparatus 140, for example a controller, which is adapted to perform a method of controlling the air charge provided to the engine 110. This method is described in more detail in relation to FIGS. 3 to 10.

Figure 2:
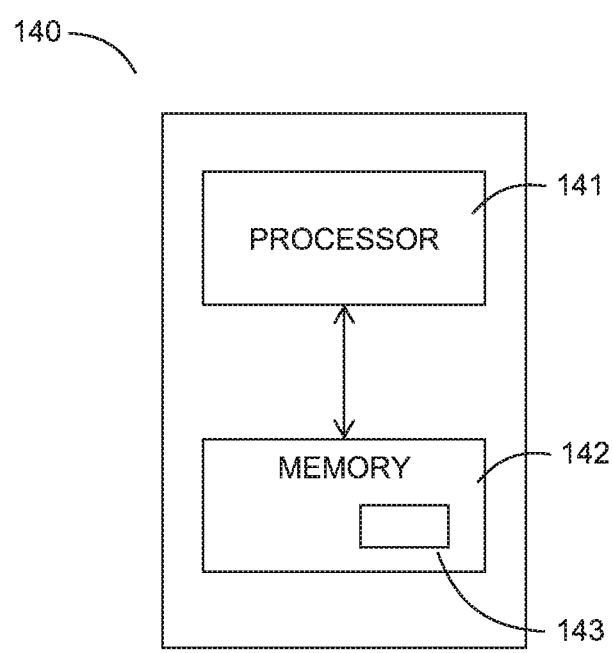
FIG. 2 schematically illustrates an apparatus.

As schematically illustrated by FIG. 2, the apparatus 140 comprises at least one processor 141 and at least one memory 142 including computer program code 143. The at least one memory 142 and the computer program code 143 are adapted to, with the at least one processor 141, cause the apparatus 140 at least to perform the method of controlling the air charge provided to the engine 110.

In order to provide a torque response which matches the received torque request, the engine 110 is provided with a suitable amount of fuel and a suitable air charge for achieving the torque response. The air charge provided to the engine 110 is dependent on the pressure within the engine intake manifold 130 and on the engine cylinders' inlet valves' lift. Valve lift refers to the duration for which the valve is opened and/or the height, in some examples as a function of time, to which the valve is opened. Valve lift may refer to the lift profile of the valve with respect to the crankshaft angle. CVVL systems enable the height to which the valve is opened and the duration over which the valve remains, at least to some extent, open to be varied for each valve actuation cycle. Valves in a CVVL system do not have a fixed, predetermined lift profile. The lift profile of valves in a CVVL system is not solely dependent on the profile of the cams which actuate them.

The pressure within the engine intake manifold 130 may vary over time based on the amount of air that flows into the engine intake manifold 130, as controlled by the input valve 131 of the engine intake manifold 130, and the amount of air that flows out of the engine intake manifold 130 into the engine cylinders 111, as controlled by the engine cylinders' inlet valves 121. The air charge provided to the engine 110 is the amount of air that flows through the engine cylinders' inlet valves 121 in one actuation cycle.

Figure 3:
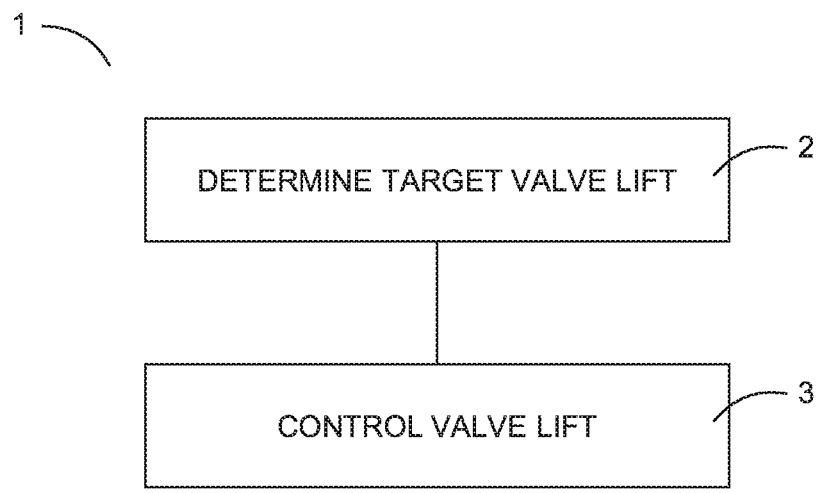
FIG. 3 schematically illustrates an example of a method of controlling the air charge provided to an engine.

FIG. 3 schematically illustrates an example of a method 1 of controlling the air charge provided to the vehicular engine 110. The method 1 comprises, at block 2, determining a target valve lift of the inlet valve 121 in the CVVL system 120 and controlling, at block 3, actuation of the inlet valve 121 in the CVVL system 120 in accordance with the determined target valve lift. The determination of a target valve lift is based on a required air charge for a given torque request and an estimate of a variable pressure of the engine intake manifold 130 for a time when the inlet valve 121 is to be actuated in accordance with the target valve lift. More detail in relation to the determination of a target valve lift is described in relation to FIG. 5 below.

Figure 4:
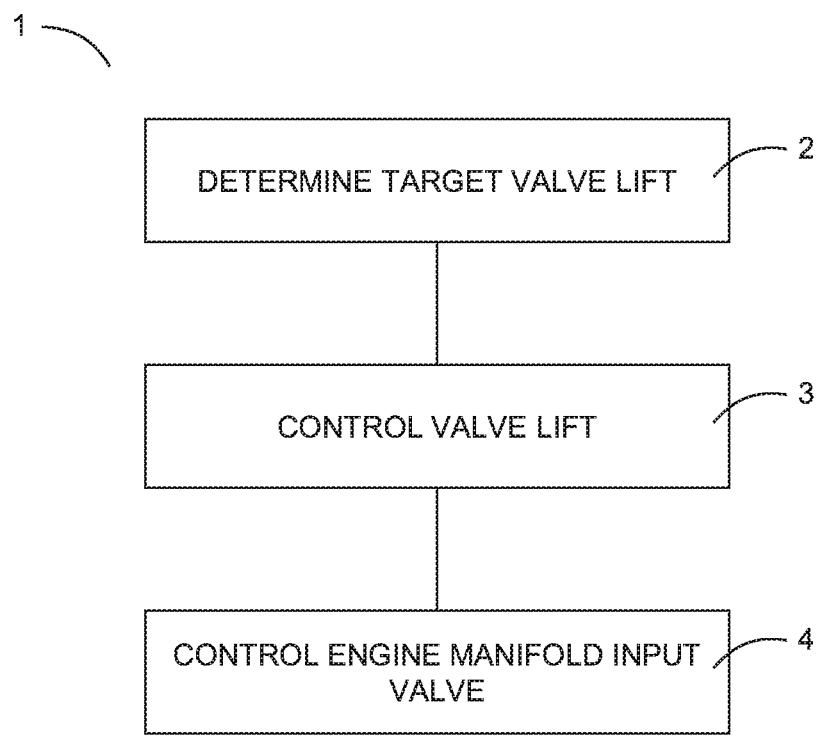
FIG. 4 schematically illustrates an example of a method of controlling the air charge provided to an engine.

FIG. 4 schematically illustrates an example of the method 1 of controlling the air charge provided to the vehicular engine 110. In addition to, at block 2, determining a target valve lift as per block 2 of FIG. 3 and, at block 3, controlling actuation of the inlet valve 121 in accordance with the determined target valve lift as per block 3 of FIG. 3, the method 1 illustrated in FIG. 4 comprises controlling, at block 4, the input valve 131 of the engine intake manifold 130. The control of the input valve 131 of the engine intake manifold 130 is based on the required air charge.

The input valve 131 of an engine intake manifold 130 is not controlled so as to maintain a constant pressure within the engine intake manifold 130 independent of the required air charge such that variation of the air charge provided to a vehicular engine 110 is achieved solely by control of the inlet valves' lift. When variation of the air charge provided to a vehicular engine 110 is achieved solely by control of the inlet valves' lift, in order to deliver the required air charge the inlet valves 121 may remain open for a longer or shorter period of the combustion cycle than is optimal. As a result, the air charge motion within the engine cylinders 111 is sub-optimal and this in turn decreases the combustion efficiency, resulting in a decrease in the fuel economy.

By achieving variation of the air charge provided to a vehicular engine 110 by controlling the input valve 131 of an engine intake manifold 130 to effect variations in the pressure within the engine intake manifold 130 and by controlling the engine cylinders' inlet valves' lift, it is possible to generate optimal air charge motion within the engine cylinders 111 whilst reducing the pumping losses associated with the conventional method of achieving variations in the air charge using only an input valve to an engine intake manifold.

The illustration of a particular order of blocks 2, 3, and 4 in FIG. 4 does not necessarily imply that there is a required or preferred order for the blocks. The order and arrangement of the blocks may be varied. The control, at block 4, of input valve 131 of an engine intake manifold 130 may be performed in advance of or substantially simultaneously with the determination, at block 2, of a target valve lift and the control, at block 3, of the inlet valve 121 in accordance with the determined target valve lift. The control, at block 4, of input valve 131 of an engine intake manifold 130 may be performed while a target valve lift is determined at block 2 and while the inlet valve 121 is controlled in accordance with the determined target valve lift at block 3. In some examples, the control of the inlet valve 131 of the engine intake manifold 130 may be delayed to ensure that there is sufficient time to obtain an estimate of a variable pressure of the engine intake manifold 130 for a time when the inlet valve 121 is to be actuated in accordance with the target valve lift.

In order to achieve the required air charge, the determination, at block 2, of a target valve lift of the inlet valve 121 in the CVVL system 120 takes account of the pressure within the engine intake manifold 130. There exists a delay between output of a control signal to command actuation of the inlet valve 121 in accordance with a target valve lift and the actuation of the inlet valve 121 in accordance with the target valve lift. When there is a change in the torque request, and hence a change in the required air charge, the pressure of the engine intake manifold 130 changes in accordance with the control, at block 4, of the input valve 131 of the engine intake manifold 130.

Because of the aforementioned delay, the pressure of the engine intake manifold 130 may be significantly different at the time when the inlet valve 121 is actuated to the time when the determination of the target valve lift is made when there exists transient conditions resulting from a change in torque request. If the target valve lift is not optimal/appropriate for the pressure of the engine intake manifold 130 at the time when the inlet valve 121 is actuated in accordance with the target valve lift, the air charge provided to the engine 110 will be too large or too small resulting in an overshoot or an undershoot in the torque response to the torque request. This may cause vehicle response issues.

Figure 5:
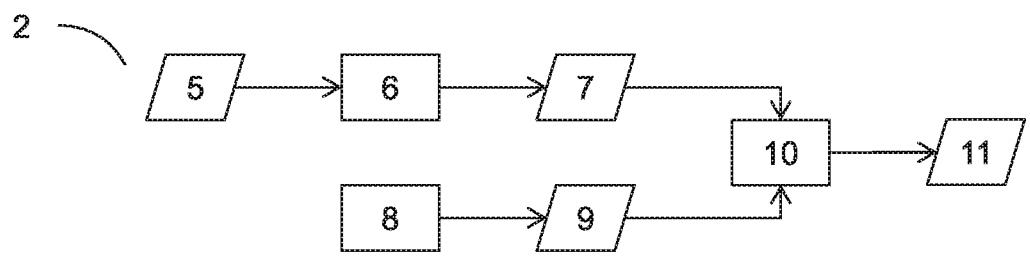
FIG. 5 schematically illustrates an example of a method of determining a target valve lift of an inlet valve in a continuously variable valve lift system.

FIG. 5 schematically illustrates an example of a method of determining a target valve lift of an inlet valve 121 in a CVVL system 120.

At block 6 a required air charge 7 for a given torque request 5 is determined. The determination involves a model of torque request against air charge. In some examples the model may comprise a look-up-table and may take a given torque request 5 as an input and provide a required air charge 7 as an output.

At block 8 a determination is made of an estimate 9 of a variable pressure of the engine intake manifold 130 for a time when the inlet valve 121 is to be actuated in accordance with the target valve lift. The estimate 9 of a variable pressure of the engine intake manifold 130 for a time when the inlet valve 121 is to be actuated in accordance with the target valve lift is determined 8 at least a first time period before a time when the inlet valve 121 is to be actuated in accordance with the target valve lift. In some examples the duration of the first time period is equal to the aforementioned delay between output of a control signal to command actuation of the inlet valve 121 in accordance with the target valve lift and the actuation of the inlet valve 121 in accordance with the target valve lift.

Because control of the valve lift of the inlet valve 121 depends on the pressure in the engine intake manifold 130 and the pressure depends on the valve lift, determining 2 a target valve lift for the inlet valve 121 based on a measurement of the pressure within the engine intake manifold 130 results in oscillating valve lift and pressure behaviour, destabilising the engine air intake system 100. Determining a target valve lift based on an estimate 9 of a variable pressure of the engine intake manifold 130 for a time when the inlet valve 121 is to be actuated in accordance with the target valve lift, rather than a measurement of the pressure within the engine intake manifold 130, de-couples the control of the pressure within the engine intake manifold 130 and the control 3 of the valve lift of the inlet valve 121 to an extent that the pressure and valve lift do not interact at a rate that is fast enough to cause oscillation and instability. Using the estimate 9 in the determination 2 of a target valve lift nevertheless does enable sufficient interaction between the pressure and valve lift so as to obtain the required air charge and not an air charge that is substantially different to the required air charge, as may result from the target valve lift being determined based on a pressure that is not at least substantially equal to the pressure at the time when the inlet valve 121 is actuated in accordance with the determined target valve lift.

Figure 6:
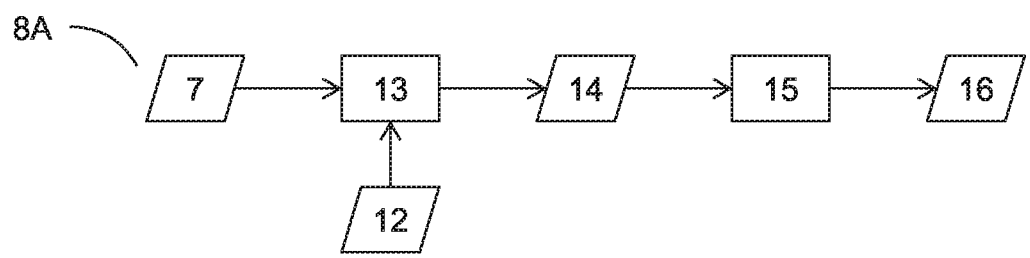
FIG. 6 schematically illustrates an example of a method of predicting change in a pressure of the engine intake manifold.
Figure 7:
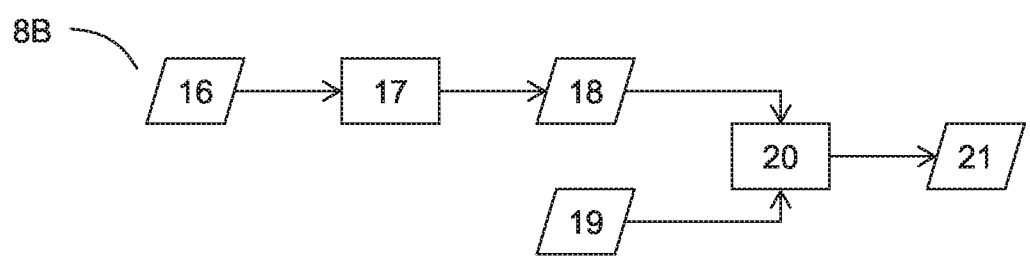
FIG. 7 schematically illustrates an example of a method of verifying the predicted change in the pressure of the engine intake manifold.
Figure 8:
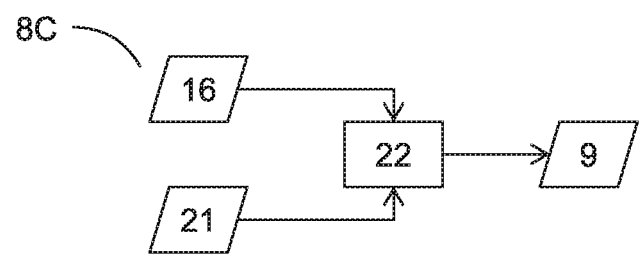
FIG. 8 schematically illustrates an example of a method of correcting the predicted change in the pressure of the engine intake manifold.

The determination 8 of the estimate 9 of a variable pressure of the engine intake manifold 130 for a time when the inlet valve 121 is to be actuated in accordance with the target valve lift is described in more detail with references to FIGS. 6 to 8. The determination 8 is a predictive process adapted by negative feedback based on measurements verifying the prediction. Each of FIGS. 6 to 8 schematically illustrate exemplary blocks 8A, 8B, 8C of this predictive process. Performance of the blocks 8A to 8C collectively determines 8 the estimate 9 of a variable pressure of the engine intake manifold 130 for a time when the inlet valve 121 is to be actuated in accordance with the target valve lift.

FIG. 6 schematically illustrates an example of a predictive block 8A. Predictive block 8A predicts how the pressure of the engine intake manifold will change over time. The predictive block 8A illustrated in FIG. 6 comprises, at block 13, determining a target pressure 14 for the engine intake manifold 130 based on the required air charge 7. The determination involves a model of required air charge 7 against target pressure 14 for the engine intake manifold 130. In some examples the model may comprise a look-up table and may take a required air charge 7 as an input and provide a target pressure 14 for the engine intake manifold 130 as an output. In the example of FIG. 6, the model is calibrated based on the engine speed 12.

Block 15 comprises a model of a predicted change in a pressure of the engine intake manifold 130 as a function of time. The model takes as an input the target pressure 14 for the engine intake manifold 130 and provides an output 16. The model applies a filter to the target pressure 14 to smooth the step change into a prediction of the substantially asymptotic response of the system to the target pressure 14. In some examples the model is a type of low-pass filter.

FIG. 7 schematically illustrates an example of a verification block 8A. Verification block 8B verifies the output of predictive block 8A against measurements to determine a correction to the output of predictive block 8A. The verification block 8B illustrated in FIG. 7 comprises determining a correction 21 for the output 16 of the model of the predicted change in the pressure of an engine intake manifold 130 as a function of time. The correction 21 is based on a difference between the output 16 of the model for a given time and a measured pressure 19 of the engine intake manifold 130 at the given time.

At block 17 a time delay is applied to the output 16 of of the model of the predicted change in the pressure of an engine intake manifold 130 as a function of time so that the resultant time delayed output 18 is in phase with the measured pressure 19 of the engine intake manifold 130. The measured pressure 19 is a real-time measurement of the pressure within the engine intake manifold 130. By bringing the output 16 into phase with the measured pressure 19, it is possible for differences between the output 16 for a given time and the measured pressure 19 at the same given time to be determined.

At block 20 a comparison is made between the time delayed output 18 and the measured pressure 19 in order to determine the correction 21. The method of block 20 is described in more detail in relation to FIG. 9 below.

FIG. 8 schematically illustrates an example of a negative feedback block 8C. Negative feedback block 8C applies the output of verification block 8B, which takes the output of predictive block 8A as an input, to the output of predictive block 8A. Specifically, in the example illustrated in FIG. 8, the negative feedback block 8C applies the correction 21, based on the verification of the output 16 against the measured pressure 19, to the output 16. Negative feedback block 8C continues to apply the correction 21 to the output 16 at subsequent times. The negative feedback block 8C illustrated in FIG. 8 comprises, at block 22, applying the correction 21 to the output 16 of the model of the predicted change in the pressure of an engine intake manifold 130 as a function of time to determine the estimate 9 of a variable pressure of the engine intake manifold 130 for a time when the inlet valve 121 is to be actuated in accordance with the target valve lift.

Figure 9:
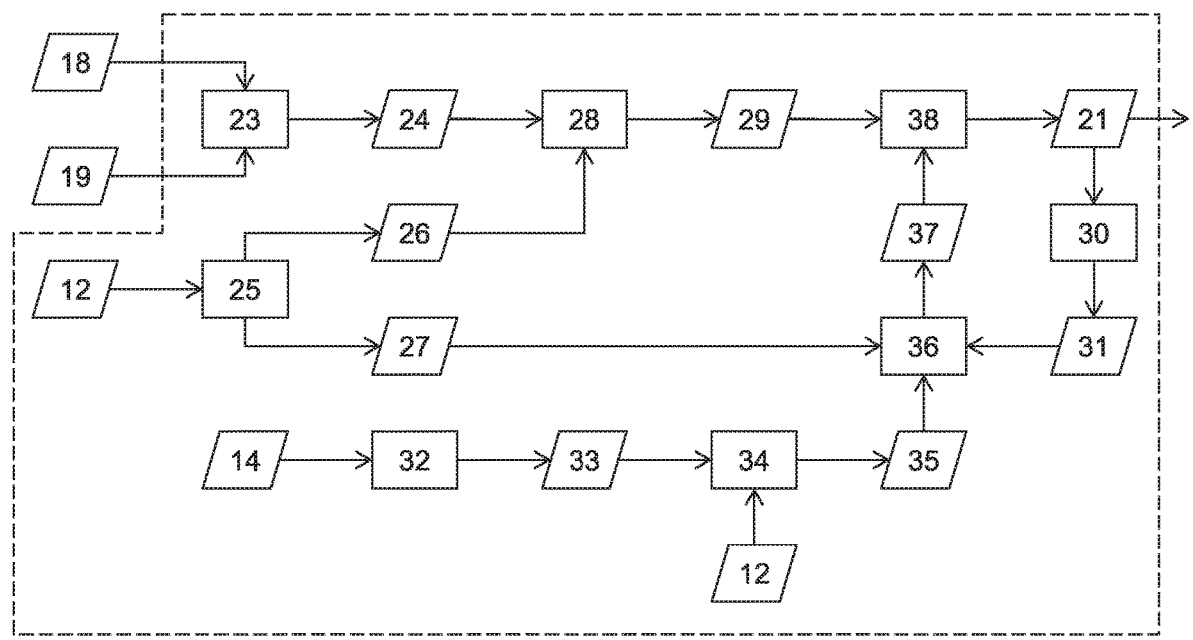
FIG. 9 schematically illustrates an example of a method of determining a correction for the predicted change in the pressure of the engine intake manifold.

FIG. 9 schematically illustrates the determination 20 of the correction 21 based on the time delayed output 18 and the measured pressure 19. A value of the correction 21 is determined intermittently, for example periodically and in some examples with a regular period. Changes in the values of the correction 21 over time are smoothed to avoid substantial step changes in the control of the inlet valve lift. Since the inlet valve 121 is controlled based, at least in part, on the pressure within the engine intake manifold 130 and the pressure within the engine intake manifold 130 decreases as a result of the air that flows out of the engine intake manifold 130 via the inlet valve 121, step changes in the control of the inlet valve lift will destabilise the engine air intake system 100. By smoothing changes in the values of the correction over time, destabilisation of the engine air intake system 100 can be substantially avoided.

At block 23 a difference 24 between the time delayed output 18 and the measured pressure 19 is determined. The difference 24 is multiplied, at block 28, by a first factor 26 to obtain a first product 29. The first product 29 is summed, at block 38, with a second product 37 to obtain a value of the correction 21. The second product 37 is the result of multiplying, at block 36, a second factor 27 by an immediately preceding value of the correction 31. The immediately preceding value of the correction 31 is held at block 30 while other blocks of the method are performed.

The first factor 26 and the second factor 27 sum to unity. The ratio of the first factor 26 to the second factor 27 is based on the engine speed 12. In some examples, block 25, comprises a map of one of the first and second factors 26, 27 against engine speed 12. In order to effect smoothing the second factor 27 is substantially greater than the first factor 26. In some examples, the second factor 27 has a value greater than or equal to 0.9 and less than 1.0 and the first factor 26 has a value less than or equal to 0.1 and greater than 0, the exact value of each being dependent on the engine speed 12. In some examples, the second factor 27 is substantially equal to 1.0 including being exactly equal to 1.0 and the first factor 26 is substantially equal to 0 including being exactly equal to 0.

In some, but not necessarily all, examples the smoothing of changes in the values of the correction 21 over time further comprises detecting a change in the required air charge 7 and applying a decay factor 35 to the immediately preceding value of the correction 31 in addition to the second factor 27 applied thereto. In some examples, such as the one illustrated in FIG. 9, this is achieved by detecting, at block 32, a change 33 in the target pressure 14 of the engine intake manifold 130 and determining, at block 34, the decay factor 35 based on this change 33. The decay factor 35 is then multiplied, at block 36, with the immediately preceding value of the correction 31 which is also multiplied, at block 36, by the second factor 27. In such examples the second product 37 is the product of the immediately preceding value of the correction 31, the second factor 27, and the decay factor 35.

The determination, at block 34, of the decay factor 35 involves a model of change 33 in the target pressure 14 of the engine intake manifold 130 against decay factor 35. In some examples the model may comprise a look-up-table and may take the change 33 in the target pressure 14 of the engine intake manifold 130 as an input and provide the decay factor 35 as an output. In the example of FIG. 9, the model is calibrated based on the engine speed 12 but this is not necessarily true for all examples. The model has a decay factor of value 1.0 when the change 33 has a value of 0. The decay factor 33 decreases both for positive and negative values of the change 33.

When the torque request 5 changes the target pressure 14 of the engine intake manifold 130 also changes. In some cases, the correction 21 to be applied to the output 16 of the model the predicted change in the pressure of an engine manifold 130 as a function of time will no longer be appropriate for the new target pressure 14. The correction 21 comprises an error. Due to the smoothing of changes in the values of the correction 21 over time, the error in the correction 21 takes time to decay. During the time when the error in the correction 21 is decaying the error is passed on to the target valve lift 11 that is determined. By applying the decay factor 35, as described in the foregoing, the error can be decayed in a shorter period of time. By decaying the error in the correction 21 rather than resetting the correction 21, a step change in the target valve lift is also avoided.

Figure 10:
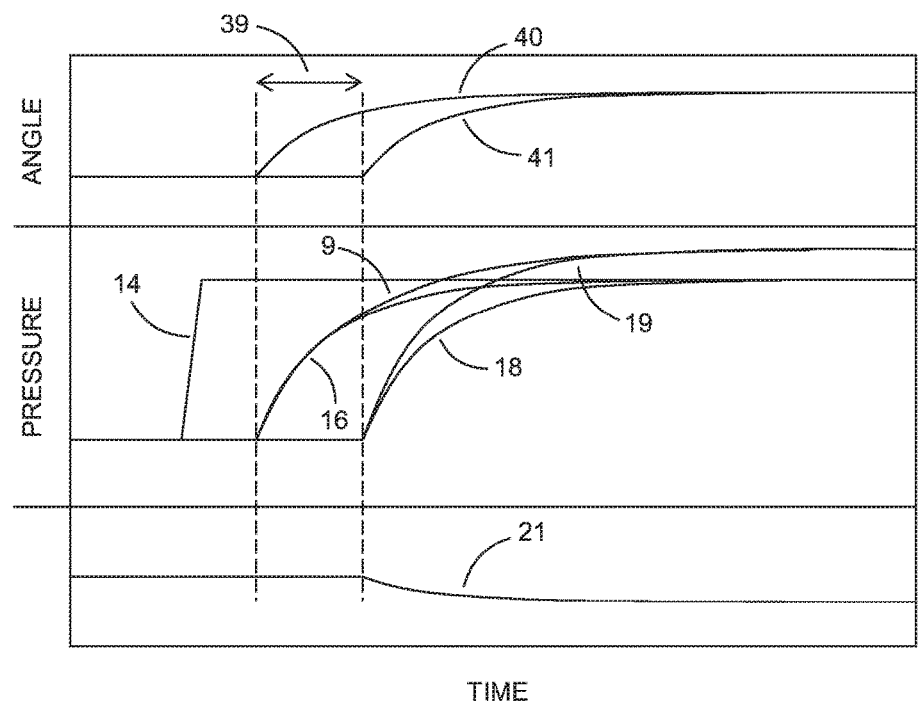
FIG. 10 schematically illustrates examples of measurements and control signals used in a method of controlling the air charge provided to an engine.

FIG. 10 illustrates examples of measurements and control signals used in the method 1 of controlling the air charge provided to the engine 110. FIG. 10 is an exemplary graph illustrating the change as functions of time of: the target pressure 14 of the engine intake manifold 130; the output 16 of the model of the predicted change in the pressure of an engine intake manifold 130 as a function of time; the time delayed output 18; the measured pressure 19 of the engine intake manifold 130; correction 21 for the output 16; and the estimate 9 of a variable pressure of the engine intake manifold 130 for a time when the inlet valve 121 is to be actuated in accordance with the target valve lift.

In the example of FIG. 10, controlling the valve lift in the inlet valve 121 comprises controlling the closing angle of the inlet valve 121 and the opening angle of the inlet valve 121 is either predetermined or controlled independently of the required air charge 7. The opening angle is the crankshaft angle at which the inlet valve is opened and the closing angle is the crankshaft angle at which the inlet valve is closed.

Therefore, according to the example of FIG. 10, determining, at block 2 of method 1, a target valve lift of the inlet valve 121 in the CVVL system 120 comprises determining a target closing angle 40 of the inlet valve 121. For comparison, FIG. 10 also illustrate the actual closing angle 41 of the inlet valve 121 that is achieved by controlling, at block 3, actuation of the inlet valve 121 in the CVVL system 120 in accordance with the determined target closing angle 40. The delay 39 between output of a control signal to command actuation of the inlet valve 121 in accordance with a target closing angle 39 and the actuation of the inlet valve 121 in accordance with the target closing angle 39 resulting in the actual closing angle 41 of the inlet valve 121 is also illustrated.

The determination 2 of a target closing angle 40 of the inlet valve 121 is based on the required air charge 7 for the given torque request 5 and the estimate 9 of a variable pressure of an engine intake manifold 130 for a time when the inlet valve 121 is to be actuated in accordance with the target valve lift. In some, but not necessarily all examples, the determination 2 is also based on one or more of the opening angle of the inlet valve 121, a phase difference between the profile of the inlet cam and crankshaft angle, a phase difference between the profile of the exhaust cam and crankshaft angle, exhaust backpressure, and engine speed 12.

Figure 11:
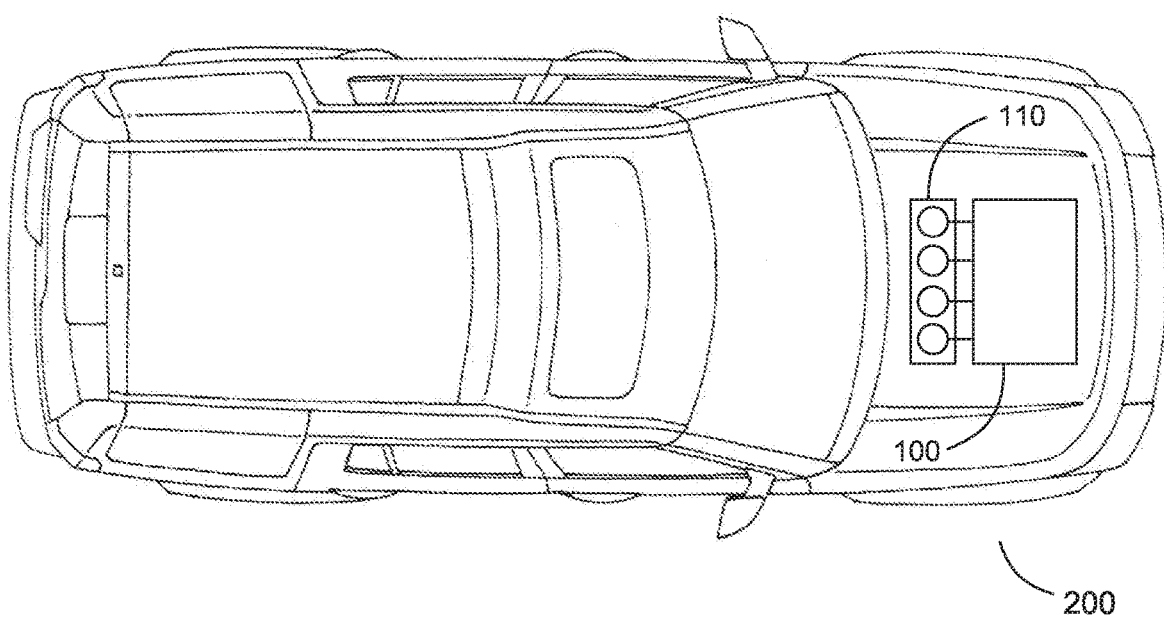
FIG. 11 schematically illustrates a vehicle.

FIG. 11 illustrates an example of a vehicle 200 comprising the engine 110, for example an internal combustion engine, and the engine air intake system 100.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium that may comprise any mechanism for storing information in a form readable by a machine or electronic processors/computational device, including, without limitation: a magnetic storage medium; optical storage medium; magneto optical storage medium; read only memory; random access memory; erasable programmable memory; flash memory; or electrical or other types of medium for storing such information/instructions.

The blocks illustrated in the FIGS. 3 to 9 may represent steps in a method and/or sections of code in the computer program 143. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of controlling an air charge provided to a vehicular engine comprising:
   determining a target valve lift of an inlet valve in a continuously variable valve lift system based, at least in part, on:
      a required air charge for a given torque request; and
      an estimate of a variable pressure of an engine intake manifold for a time when the inlet valve is to be actuated in accordance with the target valve lift;
   controlling actuation of the inlet valve in the continuously variable valve lift system in accordance with the determined target valve lift,
   wherein the estimate of the variable pressure of the engine intake manifold for the time when the inlet valve is to be actuated in accordance with the target valve lift is determined at least a first time period before a time when the inlet valve is to be actuated in accordance with the target valve lift, wherein a duration of the first time period is greater than or equal to a delay between output of a control signal to command actuation of the inlet valve in accordance with the target valve lift and actuation of the inlet valve in accordance with the target valve lift, wherein the estimate is based, at least in part, on an output of a model of a predicted change in a pressure of the engine intake manifold as a function of time; and
   applying a correction to the output of the model of the predicted change in the pressure of the engine manifold as a function of time, wherein the correction is based, at least in part, on a difference between the output of the model for a given time and a measurement of the variable pressure of the engine intake manifold at the given time.

2. The method as claimed in claim 1, wherein the model of the predicted change in the pressure of the engine manifold as a function of time is based, at least in part, on the required air charge.

3. The method as claimed in claim 1, comprising determining a value of the correction intermittently and smoothing changes in the values of the correction over time.

4. The method as claimed in claim 3, wherein smoothing changes in the values of the correction over time comprises summing:
   a product of a first factor and the difference between the output of the model for the given time and the measurement of the variable pressure of the engine intake manifold at the given time; and
   a product of a second factor and an immediately preceding value of the correction,
   wherein the first factor and the second factor sum to unity.

5. The method as claimed in claim 4, comprising:
   detecting a change in the required air charge; and
   applying a decay factor to the immediately preceding value of the correction in addition to the second factor applied thereto,
   wherein the decay factor is based, at least in part, on the change in the required air charge.

6. The method as claimed in claim 1, comprising controlling an input valve of the engine intake manifold based, at least in part, on the required air charge.

7. The method as claimed in claim 1, wherein determining the target valve lift comprises determining a target closing angle of the inlet valve.

8. The method as claimed in claim 7, wherein an opening angle of the inlet valve is one of predetermined or controlled independently of the required air charge.

9. A non-transitory storage medium containing a computer-executable program that causes a computer to perform the method according to claim 1.

10. An apparatus comprising:
   at least one processor; and
   at least one non-transitory computer readable medium including computer program code,
   the at least one non-transitory computer readable medium and the computer program code adapted to, with the at least one processor, cause the apparatus at least to perform the method according to claim 1.

11. An engine air intake system comprising:
   a continuously variable valve lift system; and
   the apparatus of claim 10.

12. The engine air intake system as claimed in claim 11 comprising:
   a cylinder head comprising intake valves and the continuously variable valve lift system; and
   an engine intake manifold including an input valve.

13. A vehicle comprising:
   an internal combustion engine; and
   the engine air intake system of claim 11.

* * * * *